UNITED STATES PATENT OFFICE.

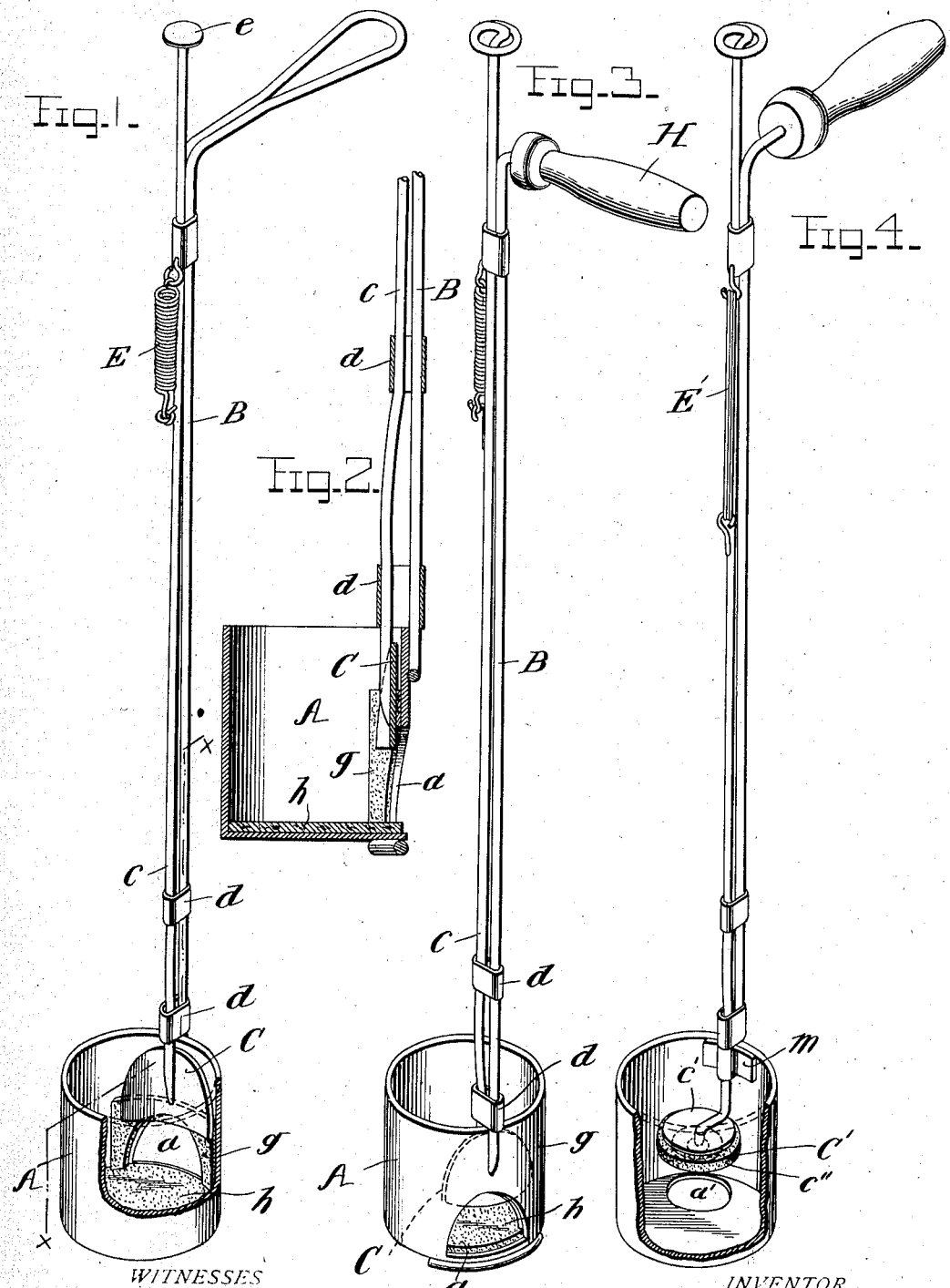

CHARLES CASPER WILLIAMS, OF COLUMBUS, OHIO.

DIPPER AND SERVER.

No. 923,229.        Specification of Letters Patent.        Patented June 1, 1909.

Application filed February 10, 1909. Serial No. 477,054.

*To all whom it may concern:*

Be it known that I, CHARLES C. WILLIAMS, a citizen of the United States, residing at Columbus, in the county of Franklin and State of Ohio, have invented certain new and useful Improvements in Dippers and Servers, of which the following is a specification.

My invention relates to a liquid dipper or server and especially to a device of this character which is designed, primarily, to measure and transfer from a bottle or other original receiver the cream needed for a cup of coffee.

The object of the invention is to provide a simple device to be used for measuring and transferring from a bottle or other receiver a charge of cream sufficient for individual use, and wherein the device is provided with a normally open spring-pressed valve which is closable by thumb pressure after the measure has received its charge, said valve automatically opening to allow the cream to be discharged directly into a cup of coffee or other beverage when the thumb pressure is removed.

While intended primarily as a table utensil adapted to measure and serve cream for individual cups of coffee, tea, chocolate and like beverage, the device is not limited to such use and will be found useful in other fields and wherever it is desired to remove measured charges of liquid from one vessel for the purpose of delivering the same into another for any purpose whatever, consequently in size or capacity the device will be varied to meet its particular uses.

With the above and other objects in view, my invention consists of the parts and the constructions and combinations of parts which I will hereinafter describe and claim.

In the accompanying drawings forming part of this specification and in which similar reference characters indicate like parts in the several views:—Figure 1 is a perspective view of a liquid measuring and serving device embodying the salient features of my invention, Fig. 2 is a vertical sectional view of the same, on the line X—X of Fig. 1, Figs. 3 and 4 are views similar to Fig. 1, but showing modifications thereof.

In the aforesaid drawings I have shown a cup, A, of cylindrical form which is supposed to be of such size and capacity as to contain at least a charge of cream sufficient for a cup of coffee, or other beverage. The general design of the cup however, is unimportant, as well as its size and capacity and the material of which it is made.

If intended for table use, the cup may be of metal, glass, china, or other material; the precious metals may also, be employed in the construction of the device to suit the fancy of intended purchasers or users, and said cup may be given such ornamentation as individual tastes may desire.

In the lower end of one of the vertical sides of the cup is provided an opening $a$, through which the cream or other liquid enters and discharges from the cup, said opening extending to the bottom of the cup to insure the discharge of the entire charge of cream or liquid when the valve controlling said opening is moved to uncover the same.

The cup has rigidly fixed to it, a handle B, of appropriate length and material and which may consist of two parallel wires bent at the upper end to form a suitable handle by which the device may be conveniently and firmly grasped by the fingers. Any other and well known type of handle may, however be used without departing from the spirit of my invention.

An important feature of my invention is the gate or valve which controls the combined filling and discharge opening of the cup, and the manner in which said valve operates.

The valve C, shown is of the sliding-gate type and it has a stem $c$, which extends parallel with the handle or stem of the cup and is slidably guided on the latter by means of bearings or guides $d$, said valve stem extending, preferably, a slight distance above the upper or bent end of the handle of the cup and having its upper end formed or provided with a button or enlarged thumb-piece $e$.

A spring, of some suitable character is so attached to the valve stem as to insure the valve being open, and normally uncovering the opening in the side of the cup, A, said spring adapted to yield when pressure is applied to the thumb-piece $c$, and the valve stem and valve moved in a direction opposite to the power exerted by the spring.

In Fig. 1, the spring E, is of a well known type having one end attached to the valve stem and the other end attached to the handle of the cup, said spring being normally under tension whereby the valve stem is normally retracted to cause the gate or valve proper to normally uncover the opening in the side of the cup A.

The gate valve shown is in the cross-sectional form of a segment whose curvature conforms to that of the inner wall of the cup, A, but it will be understood that the cross-section of the gate or valve will vary according to the character of the inner wall of the cup. In other words, the gate or valve is designed to closely conform and slide parallel to and in contact with the inner wall of said cup, and to completely cover the side opening in the cup when a transfer of cream or liquid is being made from one vessel to another.

If desired the gate or valve may slide on a lining or thin layer, $g$, of cork or other material, and may close endwise on a similar piece $h$, on the inner bottom of the cup, to insure a leak-tight joint about the walls of the opening $a$. I may also, stiffen or reinforce the bottom of the cup immediately under the opening $a$, to thereby preserve an even surface and overcome any tendency of the closing pressure of the gate or valve to force the bottom out of its true position.

The device of Fig. 3, is similar to the one shown in Fig. 1, except the handle B, of the cup is made of a single piece of heavy wire or its equivalent and the bent upper end is provided with a wood or other separate handle, H. Likewise the device of Fig. 4 is similar to the device of Fig. 3, except that a rubber band E′ is used as the spring for opening the valve. The valve C′, in this instance consists of a disk, $c'$, fixed to the lower end of the valve stem and a disk $c''$, of cork or other suitable material which is secured to the stem by suitable means, said valve adapted to close an opening $a'$ which in this instance is formed in the bottom of the cup. A curved piece $m$, fixed to the stem slides in contact with the inner wall of the cup and assists in guiding the stem in its movements.

It will be understood that the valve is normally held open in the device of Fig. 4 as previously described for the device of Fig. 1. It will also be observed that the stem of the valve is bent slightly in its length or given just bend enough so that as it slides through the guide which is fixed to the lower part of the handle, said stem will be drawn toward the handle to cause the valve to hold closer to its seat but not with enough pressure to make said valve slide hard on said seat.

In using my device, the cup is lowered into the cream or other receptacle; the valve being retracted and the opening $a$, being full open it is manifest that the cream will, without changing the normal position of the valve or holding any part of the device under tension, and without displacing the cream to cause a possible overflow from the bottle, immediately flow into the cup. When the desired amount enters the cup, the valve is closed by the pressure of the thumb on the button or piece $e$, when the device can be safely lifted out of the cup and transferred to a point over the coffee or other receiver, and when the pressure is removed from the piece, $e$, the spring acts to immediately and automatically lift the valve and allow the contents to freely flow out of the cup A into the coffee cup and to drain the very last of the contents without tipping the device.

Having thus described my invention what I claim as new and desire to secure by Letters Patent is:—

1. A device of the character described, consisting of a cup having a combined filling and discharge opening in its side, a handle rigid with the cup, a gate valve inside of the cup and slidable in contact with the inner wall thereof, a stem extending from the valve parallel with and guided on said handle, a spring having its ends connected to the handle and valve-stem respectively and acting to normally raise the valve to uncover the opening in the cup, said valve stem having a finger piece by which it is operated to cause the valve to close said opening, and said spring adapted to have its tension increased during the closing movement of said valve, and to automatically retract the valve when the pressure on the finger piece is removed.

2. In a device of the character described, the combination of a cup having a combined filling and discharge opening in its side and extending clear to the bottom thereof, of a gate valve slidable parallel with the inner wall of said cup and adapted to close said opening, a spring connected to the valve and normally under tension whereby it holds the valve normally retracted and out of register with the opening, means whereby a pressure may be placed upon the valve to move the same into register with the opening, said spring adapted to have its tension increased during the closing movement of the valve, and to automatically retract the valve when the pressure on the latter is removed, and a reinforcement fixed to the bottom of the cup immediately under the opening in line with the lower edge of the valve.

In testimony whereof I affix my signature in presence of two witnesses.

CHARLES CASPER WILLIAMS.

Witnesses:
Thos. J. Bueford,
R. H. Schnepf.